United States Patent
Blackmore et al.

(10) Patent No.: US 7,454,491 B2
(45) Date of Patent: Nov. 18, 2008

(54) METHOD AND SYSTEM FOR EFFICIENTLY TRANSFERRING A SELF-DEFINED NON-CONTIGUOUS MESSAGE IN A ONE-SIDED COMMUNICATION MODEL

(75) Inventors: Robert S. Blackmore, Poughkeepsie, NY (US); Xin Amy Chen, Poughkeepsie, NY (US); Chulho Kim, Poughkeepsie, NY (US); Rajeev Sivaram, West Orange, NJ (US); Richard R. Treumann, Highland, NY (US); Hanhong Xue, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 945 days.

(21) Appl. No.: 10/965,597

(22) Filed: Oct. 14, 2004

(65) Prior Publication Data
US 2006/0085518 A1   Apr. 20, 2006

(51) Int. Cl.
*G06F 15/16* (2006.01)
(52) U.S. Cl. ..................... 709/223; 370/282
(58) Field of Classification Search ......... 709/200–202, 709/220–232; 370/235, 300, 282
See application file for complete search history.

(56) References Cited

U.S. PATENT DOCUMENTS

| | | | |
|---|---|---|---|
| 5,440,687 A | 8/1995 | Coleman et al. | |
| 5,488,724 A | 1/1996 | Firoozmand | |
| 5,852,719 A | 12/1998 | Fishler et al. | |
| 5,892,925 A | 4/1999 | Aditya et al. | |
| 6,223,224 B1 | 4/2001 | Bodin | |
| 6,389,478 B1 | 5/2002 | Blackmore et al. | |
| 6,466,543 B1* | 10/2002 | Aoki | 370/230 |
| 7,234,008 B1* | 6/2007 | Russ | 710/52 |
| 2002/0095512 A1 | 7/2002 | Rana et al. | |
| 2002/0112069 A1 | 8/2002 | Sim | |
| 2003/0120835 A1 | 6/2003 | Kale et al. | |
| 2003/0236912 A1 | 12/2003 | Klemets et al. | |

* cited by examiner

*Primary Examiner*—Moustafa M Meky
(74) *Attorney, Agent, or Firm*—Lawrence D. Cutter; Jon A. Gibbons; Fleit, Gibbons, Gutman, Bongini & Bianco P.L.

(57) ABSTRACT

A method and system for transferring noncontiguous messages group including assembling a set of data into a series of transmission packets, packaging a description of the layout of the transmission packets into description packets and then places each description packet into a local buffer while maintaining a count of the number of description packets, transfers each description packet into a transmit buffer for transmission to at least one receiving node, identifies the data packets, and forwards each data packet to the transmit buffer for transmission to the at least one receiving node. The receiving node receives the transmission packets, identifies each packet as a description packet or data packet, places the description packets in a local buffer for storage until the description is complete, places each description packet into a user data buffer, stores data packets in a local queue until the description is complete, then transfers the data packets to the user buffer.

22 Claims, 6 Drawing Sheets

METHOD AND SYSTEM FOR EFFICIENTLY TRANSFERRING A SELF-DEFINED NON-CONTIGUOUS MESSAGE IN A ONE-SIDED COMMUNICATION MODEL

CROSS-REFERENCE TO RELATED ART

This application is related to the commonly owned, co-pending, prior U.S. patent application Ser. No. 09/517,167, entitled "Data Gather/Scatter Machine," filed on Mar. 2, 2000, and the commonly owned U.S. Pat. No. 6,389,478, entitled "Efficient Non-Contiguous Vector and Strided Data Transfer in One Sided Communication or Multiprocessor Computers," both of which the entire contents are herein incorporated by reference in their entirety.

FIELD OF THE INVENTION

The invention relates to multiprocessor computers and, more particularly, to efficiently transferring self-defined, non-contiguous messages in a one-sided communication model.

BACKGROUND OF THE INVENTION

Message Passing Interface ("MPI") defines a standard application programming interface ("API") for using several processes at one time to solve a single large problem, or a "job," on a multiprocessor and often multi-node computer (i.e., commonly one process per CPU across 1 or more multi CPU nodes). Each job can include multiple processes. A process can also commonly be referred to as a task. Each process or task can compute independently except when it needs to exchange data with another task. The program passes the data from one task to another as a "message." Examples of multiprocessor computers are, e.g., an IBM eServer Cluster 1600 available from IBM Corporation, Armonk, N.Y., and supercomputers available from Cray, Silicon Graphics, Hewlett Packard and the like.

The most commonly used portions of the MPI standard use a two sided protocol. A message transfer occurs in a two sided protocol when a task one initiates a send request and another task initiates a receive request. No data transfer occurs until both the sending and receiving tasks have made a call into the API. Often it is convenient to implement a two sided protocol with a one sided protocol. For example, IBM offers a library implementing the MPI API which in turn is implemented using the one sided LAPI (Low level API) programming model. In the one sided programming model, the sender may initiate data transfer even if the receiving task has not made a call requesting data transfer.

Data transfer in parallel programming applications can involve contiguous or non-contiguous data structures. FIG. 1 illustrates the simplest form of data transfer: the transfer of a message from a contiguous data structure 104 in an originating task 102 to another contiguous data structure 108 in a target task 106. FIG. 2 depicts the more complex scenario of transferring a message contained in a non-contiguous data structure 204 in the originating task 202 to another non-contiguous data structure 208 in the target task 206. It is also sometimes necessary to transfer from a contiguous data structure to a non-contiguous structure and vice-versa.

Transferring a message from a source 302 to a destination 304 based on a non-contiguous data structure presents significant challenges in cases where the network adapter is incapable of directly handling non-contiguous data structures. It is more difficult to transfer such a message in a one-sided model because the target data structure is provided in the original side. A one-sided communication is a communication where the receiver is not expecting or waiting to receive the data communications. U.S. Pat. No. 6,389,478, "Efficient Non-contiguous Vector and Strided Data Transfer in One-sided Communication on Multiprocessor Computers," describes a mechanism to transfer vector type non-contiguous data in one-sided communication model, which is hereby incorporated by reference in its entirety. In that invention, as shown in FIG. 3, data is transferred in such a way that each packet 306 contains description(s) 308 of the data structure and data block(s) 310.

This prior art mechanism requires a whole description of the user data structure and the data contained within the structure in a non-contiguous message to be transferred from the send side to the target side. However, there are cases when a block by block description of the data is longer than data itself. For example, a four byte data block needs two values in its description (e.g. its address and its length). Thus, the total number of bytes transferred (including data and the description of the data structure) in this method could be significantly larger than the data bytes transferred.

Another commonly owned prior art invention, U.S. patent application Ser. No. 09/517,167, entitled "Data Gather/Scatter Machine," describes a method of constructing a compact data description and packing/unpacking data from/to non-contiguous data structure to/from contiguous data structure based on the description, which is hereby incorporated by reference in its entirety. A Data Gather/Scatter Program ("DGSP") is a message level description that potentially eliminates unnecessary individual data block descriptions. However the original DGSP and Data Gather/Scatter Machine ("DGSM") concept does not handle any communication protocol problems. Using a DGSP description of non-contiguous data can improve the efficiency of non-contiguous message transfer by reducing overhead of transmitting the target data description. However, there are still problems in transferring data in this manner, such as:

1. Poor pipelining. Before any message data can actually be stored into target user addresses, the complete data description has to be available at the target. This is because the data description includes the target structure layout and data size, and the data packets cannot be processed into a user data address at the target without that information. One method of ensuring this is to have the description transferred in its entirety before starting to transfer data packet. However, such a scheme suffers from poor pipeline performance since the data cannot be shipped before it is known at the origin that the data description has arrived at the target. The notification to the sender that all data description packets have reached the destination is via an acknowledgement from target; therefore, the sender must wait for this acknowledgement before sending actual message data. This round-trip rendezvous to handshake with the receiver is very expensive, especially if there are only a few data packets in the message. One solution to this problem of poor pipelining is to try to send the data description and data together in a pipeline fashion. However, such a pipeline transmission leads to at least two other issues, mentioned next.

2. Data may arrive earlier than data description. Since networks can have multiple disjoint routes between any source-destination pair, it is possible that packets injected from a source end point to a destination end point could arrive at the destination out of order (based on the routes the individual packets chose). This race based out-of-order occurs with a small range and brief delays. More rare, but more substantial out-of-order arrival of packets can be caused by packet loss in the network and ensuing retransmission by the communication protocol. It is therefore possible for some data packets to arrive before all data description packets have arrived. Without knowing the layout of the data in the user address space that is contained in the message description, it is not possible to process these incoming data packets as they arrive from the network and assemble them into their final destination data structure. While out-of-order arrival is not extremely rare, discarding data packets that arrive before their description packets causes performance problems which result from unnecessary retransmissions and delays due to the timeouts that trigger retransmissions at the sending side.

3. The difficulty of deciding message completion. In this method of transferring non-contiguous data, the whole message consists of a data description and the data itself. Since the data description alone could be multiple packets, even for the same number of data bytes, the number of data description packets varies depending on the complexity of data structure layout, therefore the total packets is a variable. It is not possible to use traditional one total number of packets expected as a mechanism to decide if the message is complete, and a new mechanism must be devised instead.

4. The ability to send user header or data description across multiple packets. In previous implementations of vector or active messages, there are restrictions on how large the user header or data description can be. The user header is the portion of user data which is processed by client code, called the header handler, which returns the location of where to start unpacking the rest of the data. Basically, the description must fit within one user packet, not span multiple packets. This restriction severely limits the functionality of these API calls and the overall vector implementation.

Therefore, a need exists to overcome the problems with the prior art as described above.

SUMMARY OF THE INVENTION

Briefly, in accordance with preferred embodiments of the present invention, disclosed is a system, method, and computer program product transferring noncontiguous messages across a distributed computing environment containing a plurality of processing nodes coupled together over a network. The method, on a sending node, groups a set of data to be transferred into a series of transmission packets, packages a description of the layout of the set of data into a group of one or more description packets, and places each of the description packets into a transmit buffer while maintaining a count of the total number of description packets placed in the buffer. Each description packets in the transmit buffer is transmitted to at least one receiving node, identifies each of the transmission packets representing data packets, and forwards each of the data packets to the transmit buffer for transmission to the at least one receiving node.

An embodiment of the present invention, while packaging the description of the layout of the set of data into description packets is accomplished by packaging a destination data gather scattering program (DGSP).

An embodiment of the present invention, while packaging the description of the layout of the set of data into description packets further includes packaging a source data gather scattering program (DGSP) as well.

An embodiment of the present invention, while grouping a set of data to be transferred into a series of transmission packets includes grouping the set of data compatible with LAPI. Further the transmission packets include both LAPI active message and a LAPI passive message.

An embodiment of the present invention, while grouping a set of data to be transferred into a series of transmission packets includes transmitting the number of the data packets transmitted.

From the point of view of the receiving node, the method includes receiving a series of transmission packets representing a set of data which is transferred from at least one sending node and identifying each of the transmission packets as either a description packet or a data packet. The method assembles each description packet which represents a layout of the set of data to be received while counting the total number of description packages received. The method also places each data packet in the user data buffer only if all the description packets corresponding to the data packets have been previously assembled. An embodiment of the present invention includes assembling each description packet which represents a layout of the set of data to be received using a metadata unpacking routine using a source data gather scatter program (DGSP)

An embodiment of the present invention, includes packaging the description of the layout of the set of data into description packets into a destination data gather scattering program (DGSP) on the receiving node to transfer the data packets to the at least one target task.

An embodiment of the present invention, includes placing the data packet in a local buffer if all the description packets corresponding to the data packets are not yet assembled.

An embodiment of the present invention includes placing the data packet in a local buffer if all the description packets corresponding to the data packets are not yet assembled and then transferred to the user buffer when the destination DGSP is ready.

An embodiment of the present invention includes receiving the set of data to be compatible with LAPI.

An embodiment of the present invention includes one of a LAPI active message and a LAPI passive message.

BRIEF DESCRIPTION OF THE DRAWINGS

The foregoing and other features and advantages of the invention will be apparent from the following, more particular description of an exemplary embodiment of the invention, as illustrated in the accompanying drawings, in which.

DETAILED DESCRIPTION OF THE INVENTION

An exemplary embodiment of the invention is discussed in detail below. While specific implementations are discussed, it should be understood that this is done for illustration purposes only. A person skilled in the relevant art will recognize that other components and configurations may be used without parting from the spirit and scope of the invention.

Overview of the Invention:

An embodiment of the present invention contains a number of unique features and advantages to overcome the problems identified in the prior art to more efficiently transfer messages between non-contiguous data structures in one-sided communication models. To solve the poor pipelining problem, an embodiment of this invention uses an "eager mode sending" method. In this method, the sender starts to send data right after sending data description and does not need to stall and wait for the acknowledgement from target side indicating the data description has arrived. Since the sender pipelines the sending of the data description and the data by not waiting for complete acknowledgment of the data description packets before sending the data, there is possibility that some data packets arrive earlier than all data description packets.

To handle data packets that arrive before all the message data description packets have been received, an exemplary embodiment of the present invention sets up an early arrival queue of scratch buffers to temporarily store the contents of these data packets. Because any data packet that arrives in the receive FIFO and is presented to the next higher layer packet must either be processed or discarded, the data packets that arrive before the corresponding description packets are copied to scratch buffers in the early arrival queue until the complete description is available (i.e., all message description packets have arrived at the target).

An embodiment of the present invention uses two values to decide if the message is complete: (i) the number of pending description packets and (ii) the number of pending data packets. The two values provide more flexibility in the system than prior art methods since one total number of packets is not sufficient to decide the completion of data description, data blocks and the whole message (which includes the data description and data blocks).

Exemplary Distributed Computing Environment

Figure 1:
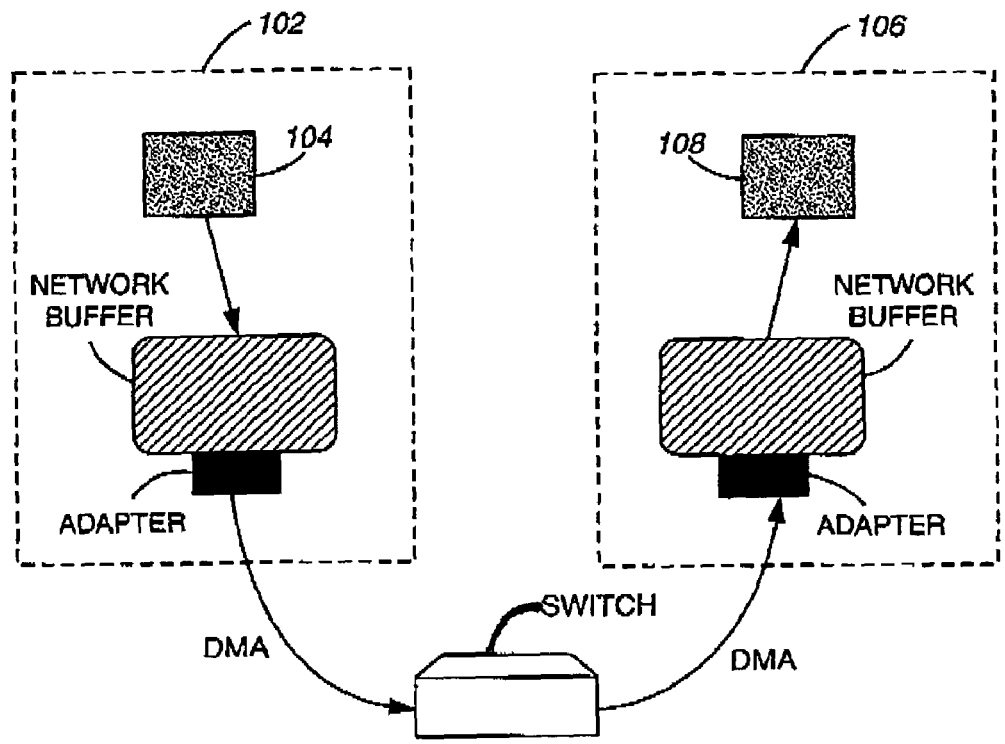
FIG. 1 is a block diagram depicting an exemplary model of a prior art transfer of a message from a contiguous data structure in an originating task to a contiguous data structure in a target task.
Figure 2:
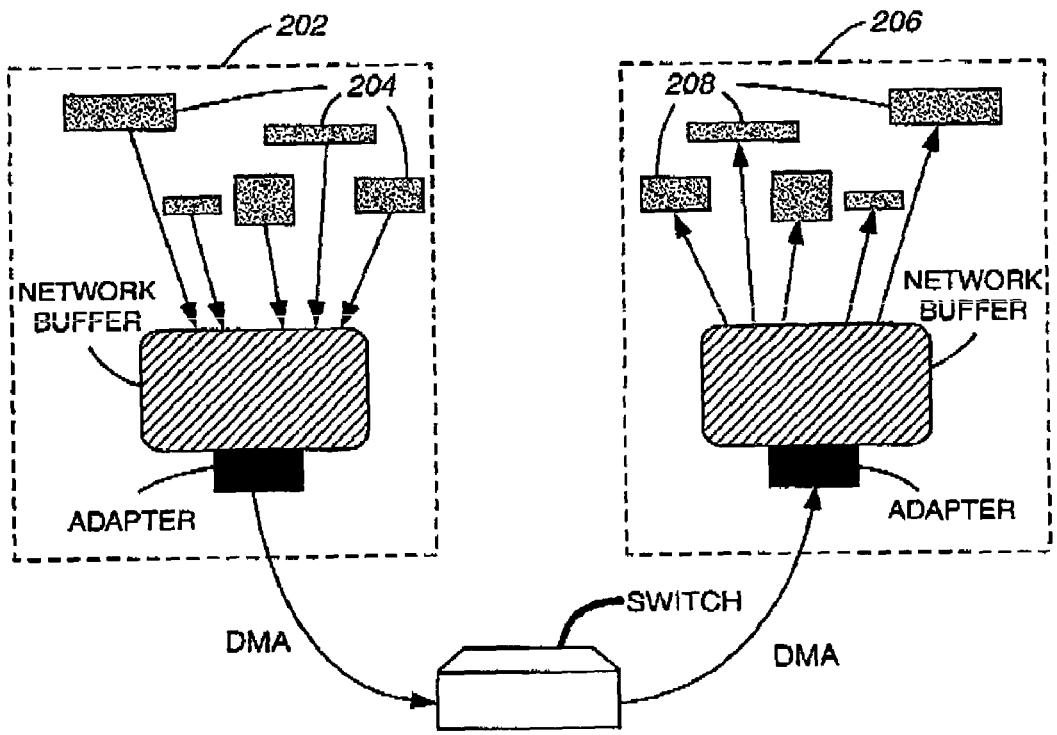
FIG. 2 is a block diagram depicting an exemplary model of a prior art transfer of a message from a non-contiguous data structure in an originating task to another non-contiguous data structure in a target task.
Figure 3:
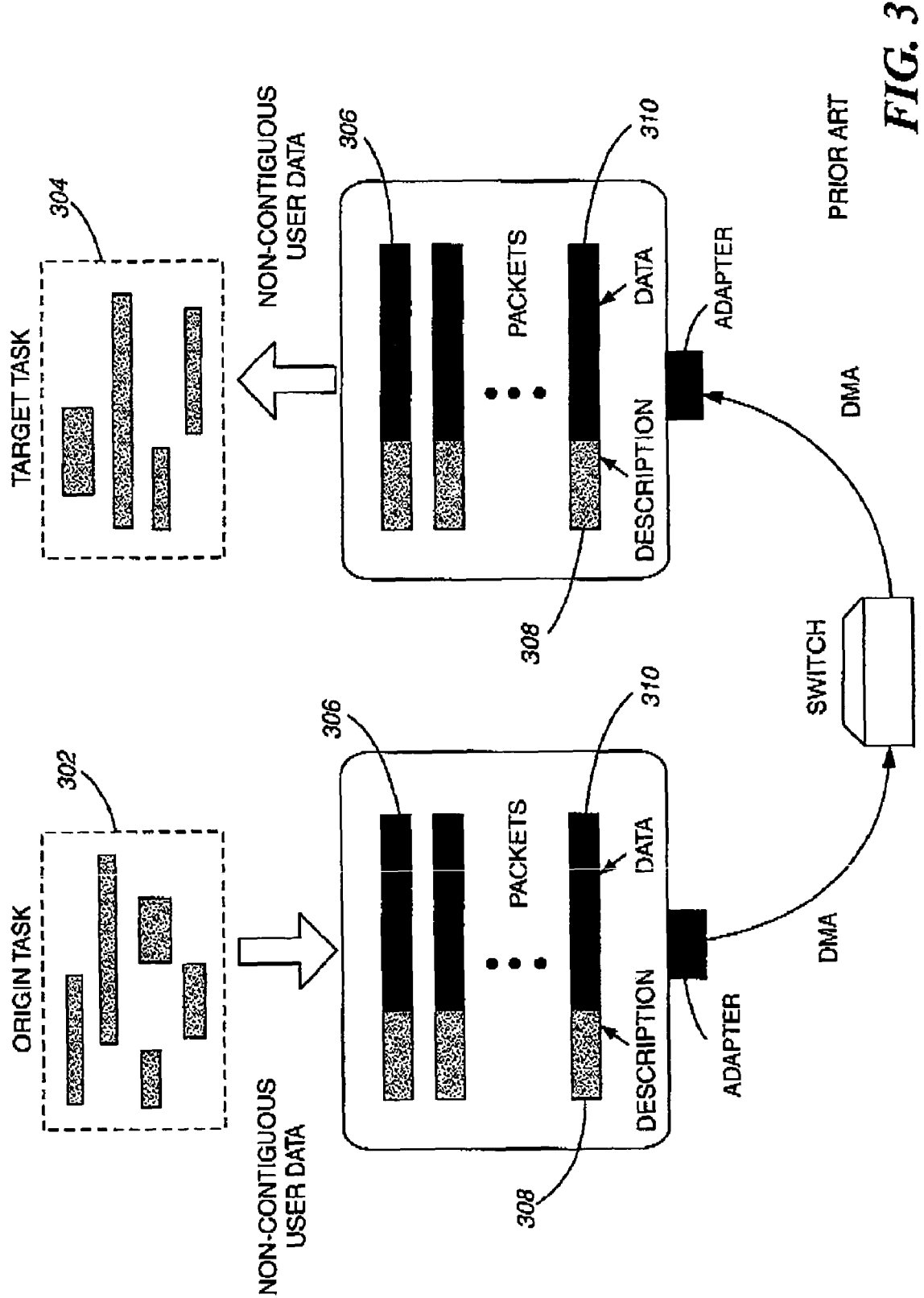
FIG. 3 is a block diagram illustrating a prior art method for transferring a non-contiguous data structure.
Figure 4:
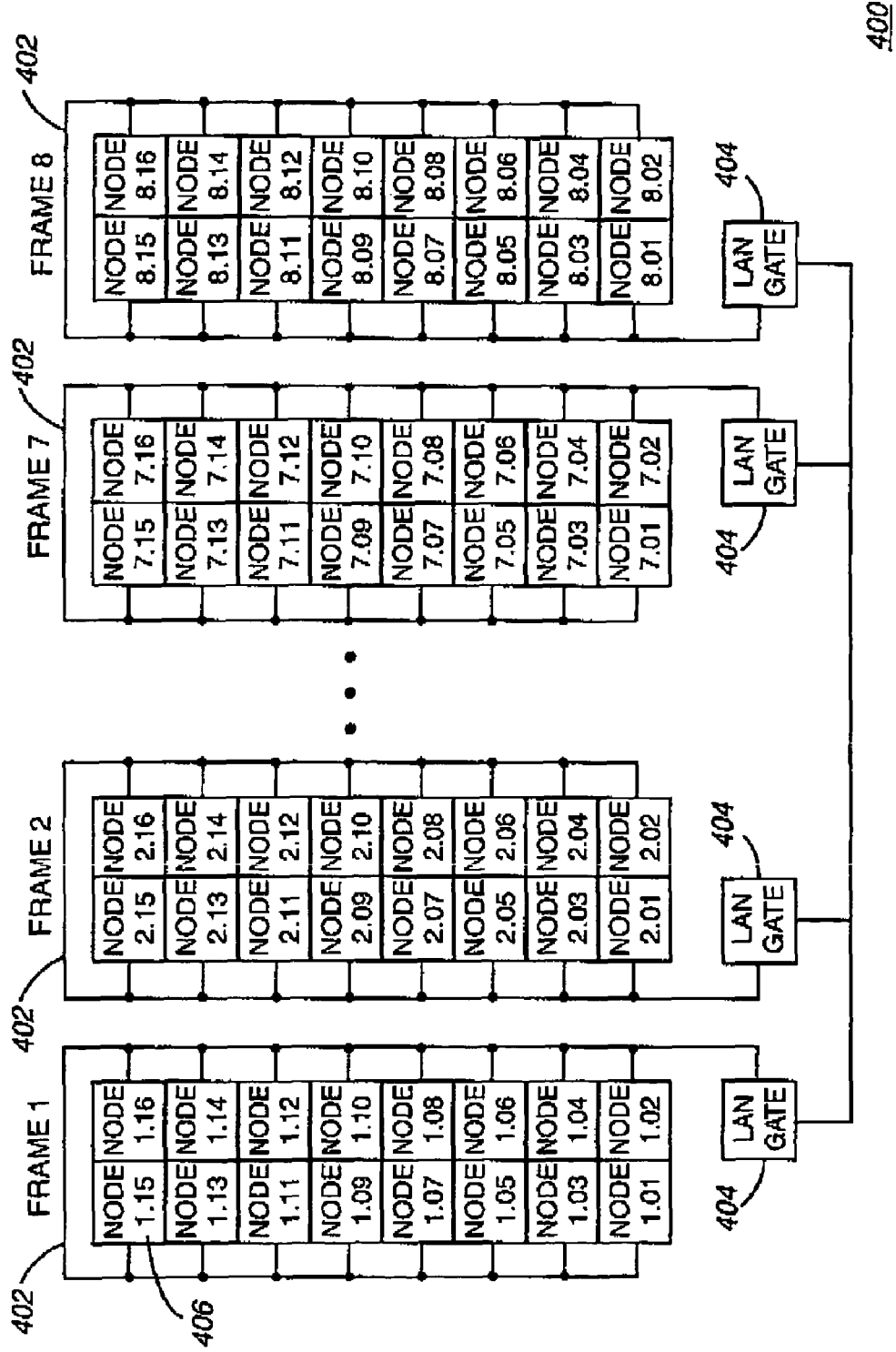
FIG. 4 depicts one example of a distributed computing environment, in accordance with an embodiment of the present invention.

In one embodiment, the mechanisms of the present invention are incorporated and used in a distributed computing environment, such as the one depicted in FIG. 4. An exemplary distributed computing environment 400 includes, for instance, a plurality of frames 402 coupled to one another via a plurality of LAN gates 404. Frames 402 and LAN gates 404 are described in detail below.

In one example, distributed computing environment 400 includes eight (8) frames, each of which includes a plurality of Systematic Multi Processor (SMP) nodes 406. Since a SMP (Symmetric Multi Processor) node normally runs all Central Processing Units (CPUs) under a single OSI (Open System Interconnect), the terms OSI and SMP can be considered interchangeable in this discussion. In one instance, each frame includes sixteen (16) processing nodes. Each processing node is, for instance, a RS/6000 (or RISC System/6000) computer running AIX, a UNIX based operating system. Each processing node within a frame is coupled to the other processing nodes of the frame via, for example, an internal LAN connection. Additionally, each frame is coupled to the other frames via LAN gates 404.

As an example, each LAN gate 404 includes either an RS/6000 computer, any computer network connection to the LAN, or a network router. However, these are only examples. It will be apparent to those skilled in the relevant art that there are other types of LAN gates, and that other mechanisms can also be used to couple the frames to one another.

In addition to the above, the distributed computing environment of FIG. 4 is only one example. It is possible to have more or less than eight frames, or more or less than sixteen nodes per frame. Further, the processing nodes do not have to be RS/6000 computers running AIX. Some or all of the processing nodes can include different types of computers and/or different operating systems. All of these variations are considered to be part of the claimed invention.

Transferring Non-Contiguous Data

Figure 5:
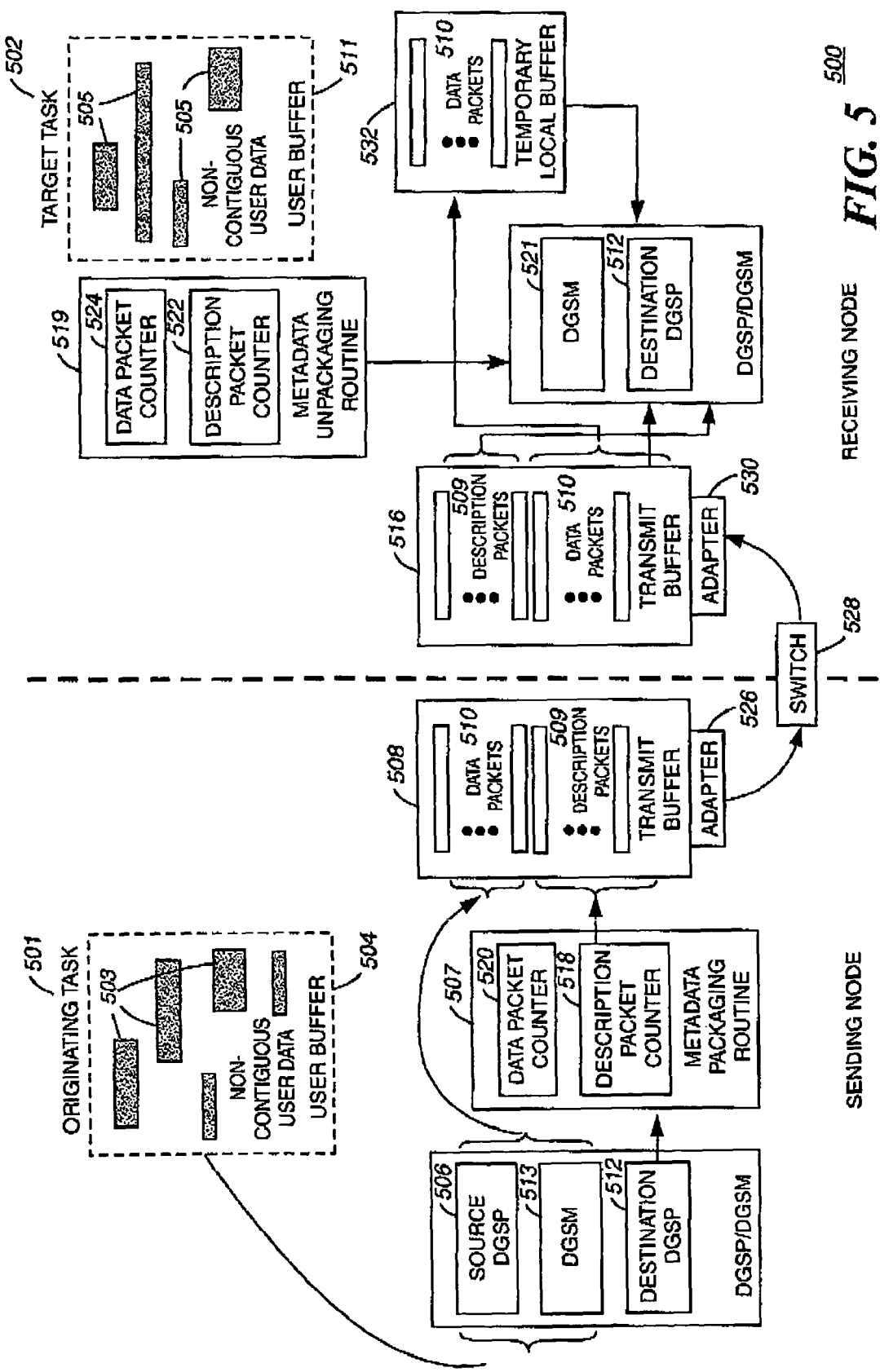
FIG. 5 is a block diagram illustrating an exemplary implementation of efficiently transferring a self-defined non-contiguous message in a one-sided communication model, in accordance with an embodiment of the present invention.

FIG. 5 shows an embodiment of the present method of transferring non-contiguous user data. An originating task 501 calls a metadata packaging routine 507 to transmit the non-contiguous data 503 that is to be stored as the non-contiguous data 505 on the receive side. The packaging routine 507 packs the data description contained in the destination DGSP 512 which will be used to create a destination DGSP 512 on the receive side, into packets in the transmit buffer 508. Each time a description packet 509 is created, the description counter 518 is decremented. When the description counter 518 is zero, all of the data necessary to create the receive DGSP 512 has been put into transmit buffers 508. The send side routine 507 then calls the DGSM 513 (Data Gather Scatter Machine) which uses the information contained in the source DGSP 506 to directly pack the non-contiguous user data 503 into the data packets 510. Each time a data packet is put in the transmit buffer 508, the data counter 520 is decremented. When the data counter 520 is zero, all of the user buffer 504 has been sent. The packets are transferred from one network adapter 526, through a switch 528, and received at the target task side by a second network adapter 530 and put into a receive buffer 516. On the receive side, the description packets 509 are used by the metadata unpackaging routine 519 to recreate the destination DGSP 512 on the receive side (hereinafter called the "receive DGSP"). If any of the data packets 510 are received before the receive DGSP 512 has been constructed, these data packets 510 are stored in the temporary buffer 532. Each time a description packet 509 is processed, the description counter 522 is decremented. When the description counter is reduced to zero, the receive DGSP 512 is complete. Each cached data packet 510 in the temporary buffer 532 is processed by calling the DGSM 521, which uses the receive DGSP 512 to place each stored data packet 510 into the associated non-contiguous data structures 505 in the user buffer 511 of the target task 502. Each time a data packet 510 from the temporary buffer 532 is processed, the data counter 524 is decremented. When all of the stored packets 532 have been processed, any remaining data packets 510 in the receive buffer 516 are processed by calling the DGSM 521, along with the receive DGSP 512, to place each data packet 510 at the proper location in the non-contiguous data structures 505 in the user buffer, and decrementing the data counter 524 for each data packet 510 processed. When the data counter 524 has reached zero, the data transfer has been completed and all of the data has been unpacked into the non-contiguous buffer 503. This method only requires the single data description for an entire message which, in almost all cases, reduces the size of the target data structure description to be sent as part of the message.

It is important to note that even though the example implemention shows description and data packets as strictkly separate packets, it is within the true scope and spirit of the present to include the start of the data in the packet containing the end of the description.

Figure 6:
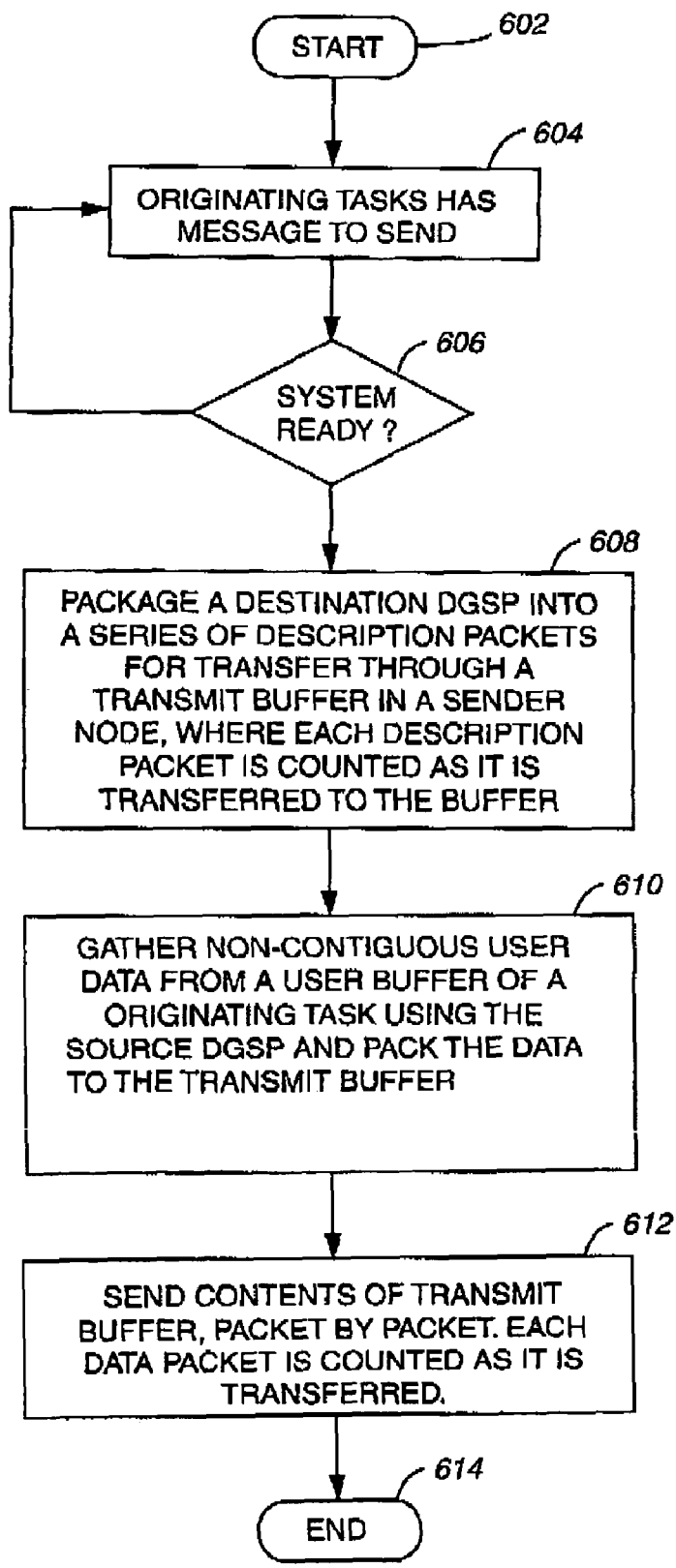
FIG. 6 is an operational flow diagram illustrating an exemplary operational sequence on a sender node for generating description packets and data packets for transmission of a non-contiguous message.

FIG. 6 shows an exemplary operational flow sequence for the send side implementation. The method begins at 602, when the originating task 501 at a transmitting node has a set of data to be sent at step 604. The method checks for system availability at step 606, to see if the physical resources for sending the message are available. If the system is not ready to send the message because of unavailability of a transmission bus and/or a token is not available to give the sender authority, the process waits until the system is available, otherwise, the metadata packaging routine 507, at step 608, packages the destination DGSP 512 into a series of description packets 509 for transference through the transmit buffer 508. The packaging routine 507 counts each description packet 509, using the description packet counter 518, as it is transferred to the transmit buffer 508. At step 610, the send-side DGSM 513, in conjunction with the source DGSP 506 which contains a description of how the non-contiguous data 503 is arranged in the user buffer 504 of the originating task 501, gathers the non-contiguous user data 503 from the user buffer 504 and packs the data into as many data packages 510 in the transmit buffer 508 as needed in order to contain the data. Finally, the contents of the transmit buffer 508 is sent, packet by packet, to at least one receiving node at step 612. Each data packet 510 is counted, using the data packet counter 520, as it is transferred.

Figure 7:
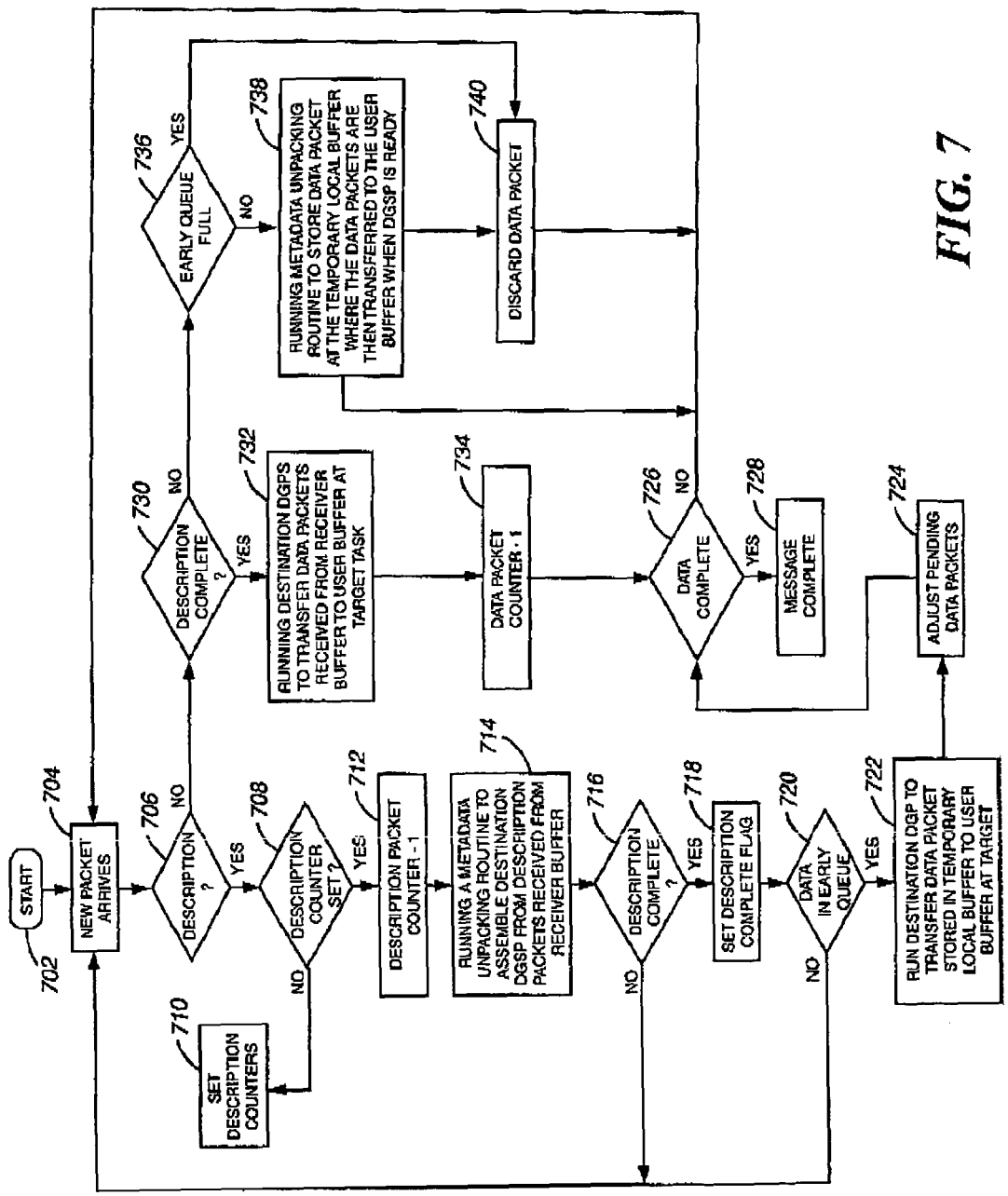
FIG. 7 is an operational flow diagram illustrating an exemplary operational sequence on a receiver node for efficiently receiving a self-defined non-contiguous message in a one-sided communication model, in accordance with an embodiment of the present invention.

Referring now to FIG. 7, the method on a receiving node begins at step 702 by determining that a new packet is arriving, at step 702. The metadata unpackaging routine 519 at step 706 checks the two bits in the flag field of the LAPI packet header of the incoming packet to determine whether the packet is a description packet 509 or a data packet 510. If the packet is a description packet 509, the unpackaging routine 519 at step 708, checks to see if the description packet counter 522 has been set and sets the description packet counter 522, at step 710, according to information contained in the packet header. Otherwise, if the description packet counter 522 has previously been set, the routine decrements the description counter 522 at step 712, and unpacks the contents of the description packet 509 received in the receiving buffer 516 to reconstruct the destination DGSP 512 on the receiving node at step 714. Then, the unpackaging routine 519 checks at step 716, to see if the description is complete (description counter=0). If the description is incomplete, the method returns to step 704 to receive the next packet. If the description is complete, the unpackaging routine 519 checks, at step 720, to see if there are any data packets 510 in the temporary local buffer 532 (also referred to as "early queue"). If there is no data in the local buffer 532, the method returns to step 704 to receive the next packet. However, if there are data packets 510 in the local buffer 532, the unpackaging routine 519 calls the DGSM 521 at step 722, which uses the destination DGSP 512 to transfer the data packets 510 stored in the temporary local buffer 532 to a user buffer 511 in the target task 502. The unpackaging routine 519 adjusts the value of the data packet counter 524 by the amount of data packets 510 transferred from the local buffer 532 at step 724. From there, the method checks to see if the data is complete (all data packets received and data counter=0) at step 726. If the data is incomplete, the method returns to step 704 to await the next packet. If the data is complete, the process ends.

However, if the incoming packet, at step 706, is a data packet 510 (i.e. not a description packet), the unpackaging routine 519 checks to see if the description is complete at step 730 (i.e. the destination DGSP 512 has been completely assembled and the description counter=0). If the description is complete at step 732, the unpackaging routine 519 calls the DGSM 521, which uses the destination DGSP 512 to transfer the data packet 510 received in the receiver buffer 516 to the user buffer 511 in the target task 502. The unpackaging routine 519 then decrements the data counter 524 at step 734. Next, the method checks to see if the data is complete (all data packets received and data counter =0), at step 726. If the data is incomplete, the method returns to step 704 to await the next packet. If the data is complete, the process ends.

If at step 730, the description is not complete, the unpackaging routine 519 checks to see if the temporary local buffer 532 is full at step 736, and providing there is sufficient available space, stores the data packet 510 into the temporary local buffer 532 at step 738, until such time as the destination DGSP 512 is ready to complete the transfer to the user buffer 511. The method then returns to step 704 to await the next packet. In the event that the temporary local buffer 532 is full, the data must be discarded at step 732, and it will be necessary to retransmit in order to receive the message in its entirety.

In addition to the above procedure, the receiving node sends an acknowledgement back to the transmitting node for each packet received. If the transmitting node does not receive acknowledgement of each packet within a predetermined amount of time, the message, or the missing portion of the message, is retransmitted.

One embodiment of the present invention uses a passive message model in which the target side reception, caching, interpretation and finally disposal of the message description that controls data scatter is handled by a communication library without explicit involvement of the target side application code. However, an extension of this implementation is to apply this new method to active message communication in which some application code is also run at message arrival. Any message level data layout description (a DGSP in this case but any other form of message level data description as well) does not only provide the target data layout needed by the communication library in distributing the data, it also encodes the information determined by the side that originated the message of which parts of the target data structure will be updated by the incoming message. This information is potentially useful at the target when the target does not have its own knowledge of which parts of the data structure the just arriving message will affect. The application's purpose in sending data to some target is so the data can be incorporated in the ongoing work of the target. To take advantage of the arrived data, the target requires some way of knowing the bounds of the data that has arrived. In some cases, this knowledge of message layout is built into the application code and it is enough for the target side to know data has arrived. In such cases, the passive message approach is sufficient. In other cases, the target side may not have such knowledge built in.

In general, an active message technique which runs a user header handler at the arrival of the first packet is a known technique which allows the application to capture information about the message to guide the incorporation of that message into the ongoing computation of the application or other activities. The planned extension of this invention will have the communication library cache the DGSP in more persistent storage and pass a handle for that cached DGSP to the user header handler as a parameter. The header handler of the application, in one embodiment, records the handle and instruct the communication library to preserve the target data structure description for future use by the application. When the application comes to the point of needing to discern what parts of the target data structure has been modified by the message the cached description can be accessed and analyzed by the application, using the handle to access the preserved DGSP. The information remains available to the application for as long as it is needed and then can be disposed by an application call a FREE(handle) routine advising the communication library it may now discard the DGSP.

In an example embodiment of the present invention, the platform is any computer capable of running multiple processes in which each process runs with its own address space but under a single OSI. The OSI supports mapping of address ranges between distinct address spaces, and can be run to exploit multiple processors which may not have access to a single common address space. It will be apparent to those skilled in the art that implementation is not limited to such an exemplary platform.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-implemented method of transferring non-contiguous messages across a distributed computing environment comprising a plurality of processing nodes coupled together over a network, the method on a sending node comprising:
   grouping a set of data to be transferred into a series of transmission packets for transmission from an originating task executing on a sending note to at least one target task executing on at least one receiving node;
   packaging a description of a layout of a user buffer on the at least one receiving node into a group of one or more description packets;
   placing each of the description packets into a transmit buffer of the sending node and maintaining a count of the total number of description packets placed in the transmit buffer for transmission therefrom to the at least one receiving node; and
   identifying and gathering each of the transmission packets which represent data packets and forwarding each of the data packets to the transmit buffer for transmission therefrom to the at least one receiving node.

2. The computer-implemented method of claim 1, wherein the packaging the description of the layout of a user buffer on the at least one receiving node into a group of one or more description packets includes packaging a destination data gather scattering program (DGSP).

3. The computer-implemented method of claim 1, wherein the identifying and gathering each of the transmission packets which represent data packets and forwarding each of the data packets to the transmit buffer for transmission therefrom to the at least one receiving node which includes packaging using a source data gather scattering program (DGSP).

4. The computer-implemented method of claim 1, wherein the grouping the set of data to be transferred into the series of transmission packets includes grouping the set of data compatible with LAPI.

5. The computer-implemented method of claim 1, wherein the grouping the set of data to be transferred into the series of transmission packets further includes one of a LAPI active message and a LAPI passive message.

6. The computer-implemented method of claim 1, further comprising:
   transmitting a number of the description packets transmitted.

7. The computer-implemented method of claim 6, further comprising:
   transmitting a number of transmission packets transmitted.

8. The computer-implemented method of claim 1, further comprising:
   transmitting a number of the data packets transmitted.

9. A computer-implemented method of transferring non-contiguous messages across a distributed computing environment comprising a plurality of processing nodes coupled together over a network, the method on a receiving node comprising:
   receiving a series of transmission packets representing a set of data which is transferred from at least one originating task executing on at least one sending node to at least one target executing on a receiver node;
   identifying each of the transmission packets into one of two groups of description packets and data packets and in response to
      a transmission packet identified as a description packet, assembling using an metadata unpacking routine, a description of a layout of a set of data to be received by at least one target task executing on the at least one sending node; and
      a transmission packet identified as a data packet, transfer the data packets to the at least one target task.

10. The computer-implemented method of claim 9, wherein in response to the transmission packet identified as a description packet further comprises, assembling using the metadata unpacking routine, a destination data gather scatter program (DGSP) which describes the layout of a user buffer in the at least one target task executing on the at least one sending node.

11. The computer-implemented method of claim 9, wherein in response to the transmission packet identified as a data packet further comprises running a destination data gather scattering program (DGSP) to transfer the data packets to the at least one target task.

12. The computer-implemented method of claim 11, wherein in response to the transmission packet identified as a data packet further comprises transferring the data packet to the user buffer when the destination DGSP is ready.

13. The computer-implemented method of claim 9, wherein in response to the transmission packet identified as a data packet further comprises placing the data packet in a local buffer if all the description packets corresponding to the data packets are not yet assembled.

14. The computer-implemented method of claim 9, wherein the receiving the series of transmission packets representing the set of data includes receiving the set of data to be compatible with LAPI.

15. The computer-implemented method of claim 9, wherein the receiving the series of transmission packets representing the set of data further includes one of a LAPI active message and a LAPI passive message.

16. The computer-implemented method of claim 9, further comprising:
   receiving a number of the description packets transmitted.

17. The computer-implemented method of claim 16, further comprising:
   receiving a number of transmission packets transmitted.

18. The computer-implemented method of claim 9, further comprising:
receiving a number of the data packets transmitted.

19. A computer program product for transferring data between two application data structures, the computer program product comprising:
a storage medium readable by a processing circuit and storing computer instructions for execution by the processing circuit for performing a method comprising:
grouping a set of data to be transferred into a series of transmission packets for transmission from an originating task executing on a sending note to at least one target task executing on at least one receiving node;
packaging a description of a layout of a user buffer on the at least one receiving node into a group of one or more description packets;
placing each of the description packets into a transmit buffer of the sending node and maintaining a count of the total number of description packets placed in the transmit buffer for transmission therefrom to the at least one receiving node; and
identifying and gathering each of the transmission packets which represent data packets and forwarding each of the data packets to the transmit buffer for transmission therefrom to the at least one receiving node.

20. A computer program product for transferring data between two application data structures, the computer program product comprising:
a storage medium readable by a processing circuit and storing computer instructions for execution by the processing circuit for performing a method comprising:
receiving a series of transmission packets representing a set of data which is transferred from at least one originating task executing on at least one sending node to at least one target executing on a receiver node;
identifying each of the transmission packets into one of two groups of description packets and data packets and in response to
a transmission packet identified as a description packet, assembling using an metadata unpacking routine, a description of a layout of a set of data to be received by at least one target task executing on the at least one sending node; and
a transmission packet identified as a data packet, transfer the data packets to the at least one target task.

21. A distributed computing system having a multiplicity of nodes, each node running a plurality of processes, the system comprising:
a processing circuit for transferring data between two application data structures, the processing circuit comprising:
means for grouping a set of data to be transferred into a series of transmission packets for transmission from an originating task executing on a sending note to at least one target task executing on at least one receiving node;
means for packaging a description of a layout of a user buffer on the at least one receiving node into a group of one or more description packets;
means for placing each of the description packets into a transmit buffer of the sending node and maintaining a count of the total number of description packets placed in the transmit buffer for transmission therefrom to the at least one receiving node; and
means for identifying and gathering each of the transmission packets which represent data packets and forwarding each of the data packets to the transmit buffer for transmission therefrom to the at least one receiving node.

22. A distributed computing system having a multiplicity of nodes, each node running a plurality of processes, the system comprising:
a processing circuit for transferring data between two application data structures, the processing circuit comprising:
means for receiving a series of transmission packets representing a set of data which is transferred from at least one originating task executing on at least one sending node to at least one target executing on a receiver node;
means for identifying each of the transmission packets into one of two groups of description packets and data packets and in response to
a transmission packet identified as a description packet, assembling using an metadata unpacking routine, a description of a layout of a set of data to be received by at least one target task executing on the at least one sending node; and
a transmission packet identified as a data packet, transfer the data packets to the at least one target task.

* * * * *